May 24, 1938.   R. H. MONEY   2,118,356

ONE-WAY VALVE

Filed March 7, 1935

INVENTOR.
ROLAND H. MONEY.
BY
Allen & Allen
ATTORNEYS.

Patented May 24, 1938

2,118,356

UNITED STATES PATENT OFFICE 2,118,356

ONE-WAY VALVE

Roland H. Money, Cincinnati, Ohio, assignor to The Crosley Radio Corporation, Cincinnati, Ohio, a corporation of Ohio Application March 7, 1935, Serial No. 9,843

1 Claim. (Cl. 251—119)

My invention relates to one way valves, particularly valves for use as exhaust valves in compressors for refrigeration or other purposes. However, there are numerous other purposes for which my novel valve may be used, and the following description is merely exemplary and not limiting.

It is sometimes the practice in refrigerator compressors to exhaust the compressed gases from the compressor into a pressure chamber or dome in which the compressor itself, and frequently the driving motor is located, and in which the oil for lubricating the moving parts is also contained. The compressor in these instances is often immersed in the oil and the gas exhausted from the compressor passes through the body of oil. While in most cases the one way reed type valve, resiliently urged against a seat on the compressor housing, is adequate for this purpose, when oil gets into the pressure line or when the compressor is immersed in a body of oil, certain new problems arise. For instance, if the reed valve is so adjusted as to permit the compressed gases to pass when a given pressure is attained in the compressor, and to insure that no oil flows back into the compressor when the valve is opened, the adjustment may not permit any globule of oil which may have accumulated in the compressor being blown out. In compressors for regrigerating purposes, oil in the pressure lines is always encountered, since oil is continually being circulated through the system, either in solution in a miscible refrigerant or in suspension in an immiscible refrigerant. It is thus necessary to provide for the passage of globules or slugs of oil through the valves without interference with the normal action thereof. It has heretofore been impossible to adjust the reed type valve on compressors of this type in such a manner that it will permit the compressed gases to flow through without any back flow of oil, but when a slug of oil or other obstruction arrives at the valve, to permit the passage thereof by providing an effectively larger opening without disturbing the adjustment of the valve.

It is an object of my invention to provide a one way valve which solves this problem.

Another object of my invention is to provide a one way reed type of valve, in which the reed is permitted to move only a limited distance from the valve seat under ordinary conditions of exhausting gas from the compressor, and a greater given distance only when a slug of oil or other obstruction is encountered. This will preserve the spring and resiliency of the reed itself, and prevent permanent bending of the reed.

It is a further object of my invention to provide a valve having all of the above characteristics and advantages, but which will be muffled so that there will be no apparent noise when the valve functions in either capacity of blowing out a slug of oil, or merely exhausting compressed gas. This muffling of the valve is particularly important when the valve itself is immersed below the level of the body of oil, and the compressor is of the rotary type, having little natural noise.

A further object of my invention is to provide a novel valve which may be constructed very cheaply, which maintains its original adjustment without constant attention, and which may be readily replaced and repaired.

It is apparent that my novel valve is not limited to use with compressors which are positioned under the surface of a body of oil, since the desirable features of the valve may be also realized in any compression line in which oil or foreign matter is apt to accumulate.

These and other objects of my invention, which will be set forth hereinafter or will be apparent to one skilled in the art upon reading these specifications, I accomplish by that certain construction and arrangement of parts of which I shall now describe a preferred embodiment. Reference is made to the drawing which forms a part hereof, and in which.

Figure 1:
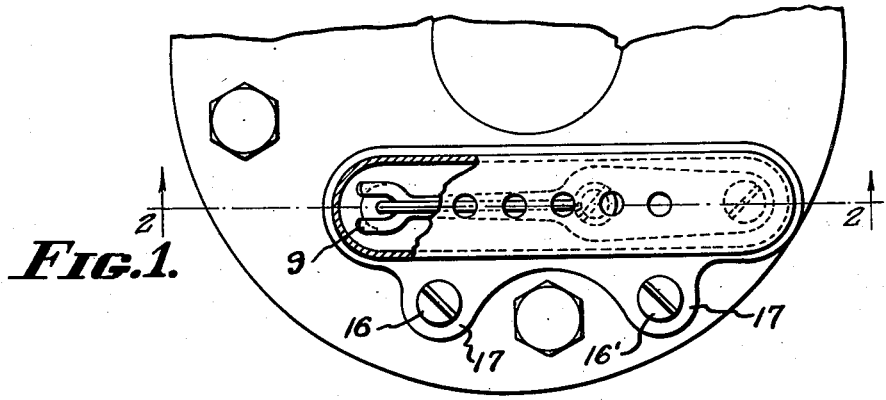
Figure 1 is a plan view of one modification of my novel valve.

Briefly, my invention contemplates the use of the usual reed valve, resiliently urged against the valve seat, but has also a limiting abutment member restricting the movement of the valve reed from its seat under normal pressure as when the compressed gases are being exhausted. This abutment is itself movable against an abnormal pressure in order to permit greater movement of the reed from the valve seat when oil or foreign matter reaches the valve port. This construction insures that the reed will only move the first or shorter distance when gas is being exhausted and thus prevent any back flow of oil;

but will move the greater or second distance, against the resistance of the abutment when a slug of oil is entering the port, thus raising the pressure to a greater degree. Also I provide a stationary, limiting abutment which will prevent undue movement of the reed, which might produce a permanent set therein.

In the practice of my invention, I provide an exhaust port 1 in the cylinder head 2 of the compressor. This port 1 may be surrounded by an annular projection extending above the surface of the adjacent parts of the compressor head 2, or there may be an annular groove 3 surrounding it, in order to present and form a valve seat 3. A reed 4 of predetermined configuration and formed of resilient material is fastened to the cylinder head 2 by means of the screws 5 and 5' in such a manner that the end 6 will cover and be urged against the valve seat 3 and thus cover the port 1. Held in place by the two screws 5 and 5' is a guide 8 for the abutment 7. The guide 8 is formed of relatively stiff and non-resilient material, and is so configured as to provide a fork shaped end 9, which is positioned over the end 6 of the reed 4. This guide 8 is positioned over the reed 4 with the end 9 bent upwardly so as to lie a predetermined distance above the end 6 of the reed 4. This guide member thus provides a positive stop member limiting the ultimate movement of the reed.

Figure 2:
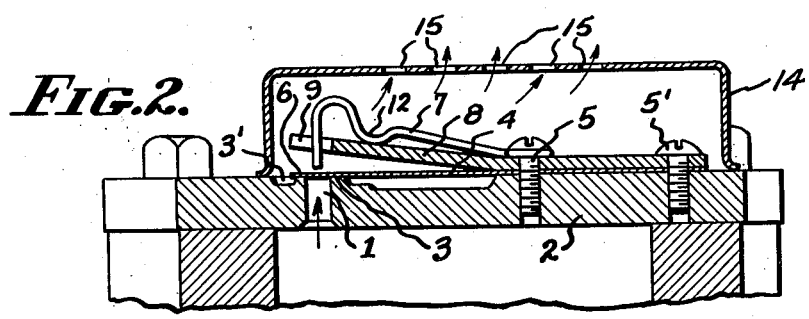
Fig. 2 is a section of the structure of Fig. 1, taken on the section line 2—2 of that figure.

The abutment 7 is formed of relatively stiff, but resilient wire bent to form a loop 11 at one end and a downwardly projecting point or end 10 at the other end. This formation is attained by forming a hook on the opposite end of the wire from the loop 11 and bending this hook at a right angle to the plane of the loop 11. This abutment member 7 is held in place on top of the guide 8 by the screw 5 which passes through the loop 11, and with the end 10 projecting through the fork 9, as is clearly shown in Figs. 2 and 3. There is a kink or bend 12 formed in the wire abutment 7 so as to rest against the upper side of the guide 8 and to position the end 10 of the wire 7 a given definite distance from the reed end 6, when the reed is in closed position.

A muffler comprising a chamber or casing 14, having exhaust ports 15, is placed over the valve mechanism, and is held in place by screws 16 and 16' passing through lugs 17 on the casing and threaded into the cylinder head 2.

The operation of the valve is as follows: When the gas in the compressor has reached the pressure desired, it raises the reed end 6 from the valve seat 3 such a distance that the end 6 will strike the abutment 10. Normally this will limit its motion. This permits the gas to escape through the port 1 and out through the ports 15 in the casing 14 of the muffler. If a slug of oil has accumulated in the compressor and reaches the port, it may not be able to pass through the restricted opening provided by normal movement of the reed, and a greater pressure may be created in the compressor. A greater pressure will cause the reed end 6 to move the abutment 10 upwardly against the resiliency of the wire 7 until the reed end 6 strikes the forked end 9 of the guide 8. This, of course, will give a much greater clearance between the reed end 6 and the valve seat 3 and will permit the slug of oil to be blown through. After the slug has been blown through the reed end 6 will, of course, return to normal position. The position of the forked end 9 of the stop member 8, above the valve seat 3, determines the greater distance the reed end 6 may be moved away from the valve seat 3. This distance is, of course, adjusted so as to permit the escape of expected obstructions, but not to be so great as to permit the reed 4 to bend beyond its elastic limit. The position of the abutment 10 is determined by the size of the bend 12 which rests against the top of the guide 8. Hence the distance the reed end 6 will travel above the valve seat 3 under normal pressure, or when the gas is being discharged, is determined by the distance the end 10 of the abutment 10 is above the valve seat 3. The chamber 14 surrounding the mechanism with the exhaust ports 15 greatly muffles both the noise of the seating and opening of the valve, and if the mechanism is below the oil level the noise of the bubbling of the gas through the body of the oil.

Figures 3, 5:
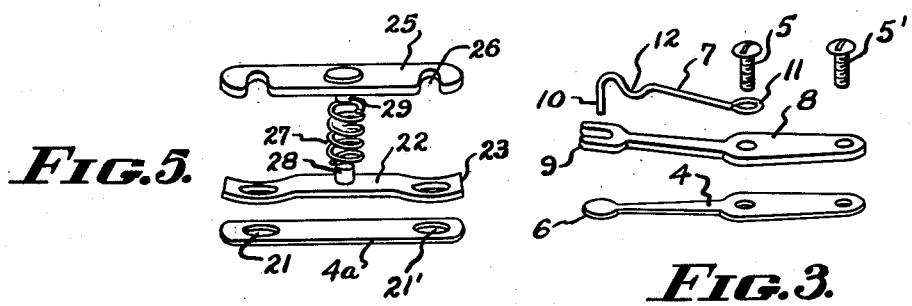
Fig. 3 is an exploded view of the valve mechanism shown in Figs. 1 and 2.
Fig. 5 is an exploded view of the valve mechanism shown in Fig. 4.
Figure 4:
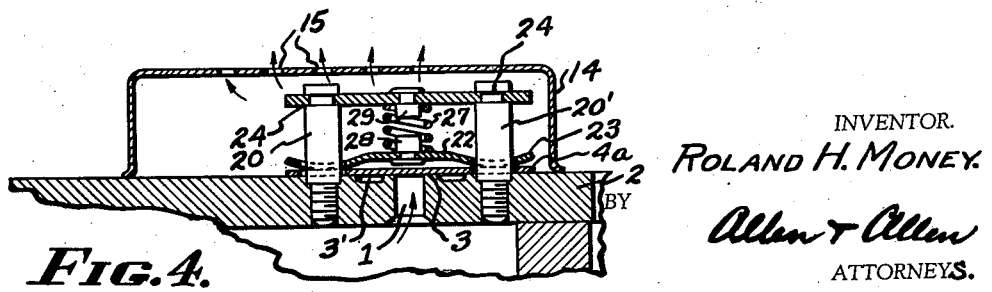
Fig. 4 is a section of a modified form of my novel valve.

The modified form of my novel valve is shown in Figs. 4 and 5. In this case, as in the other form, the valve port 1 may have the annular groove 3' surrounding it in order to present a valve seat 3. The reed 4a, which is again a strip of resilient material, is positioned over the port 1 so that the central portion of the end of the reed 4a rests on the valve seat 3. Two upstanding lugs 20 and 20' are fastened onto the compressor head 2 on opposite sides of the port 1. The reed 4a is held in position over the valve seat 3 by the provision of two oval holes 21 and 21' in the reed 4a near its ends, which fit over these lugs 20 and 20'. These holes 21 and 21' are oval with the longest axis longitudinal to the center line of the reed 4a, so that if the reed 4a is sprung in the center it will not bind on the lugs 20 and 20'. Positioned over the reed 4a is an arbor 23, which is held in place by the lugs 20 and 20', passing through holes 22 therein. This arbor 23 is approximately the same shape as the reed 4a but may be made of non-resilient material, and is bent upwardly a given predetermined distance at the center portion 22 over the valve seat 3. The lugs 20 and 20' are relatively long and have annular grooves 24 near their ends. A second straight arbor 25, of relatively non-resilient material, has two notches 26 near its ends, which notches will slide into the grooves 24 in the ends of the lugs 20 and 20', and are thus held in position near the top of the lugs. A coil spring 27 is placed between the arbor 23 and the arbor 25 in such a manner that the arbor 23 will be urged toward the valve seat 3. However, since the center portion of the arbor 23 is bent upwardly, the arbor 23 will only contact the reed 4a near its end portions and thus hold the reed 4a in position with its center portion against the valve seat 3. There are two bosses 28 and 29 in the center of the two arbors 23 and 25, these bosses projecting toward each other. They serve both to hold the coil spring 27 in position, and to determine the distance the lower arbor 23 may approach the upper arbor 25. This mechanism is covered by a muffling chamber 14, with exhaust ports 15, which may be held in position on the cylinder head 2 in the same manner as the muffling chamber described above.

The action of this modified valve is as follows:—

The compressed gases, as they are exhausted, bend or spring the center portion of the reed 4a upward from the valve seat 3 and permit the gas to escape into the muffling chamber 14 and out through the ports 15. The normal limit of upward movement of the center portion of the reed 4a is determined by the amount of upward bend in the arbor 23. If there is a slug of oil, or other obstruction at the port, the increased pressure will lift the arbor 23 against the spring 27 and permit the slug to be blown out into the chamber 14. The distance of movement of the lower arbor 23 and the reed 4a will be determined by the distance between the two bosses 28 and 29. It is to be noted that in this modification, the reed 4a is never bent or sprung more than the normal distance, since at greater pressure the lower arbor 23 rides up and the reed 4a with it. The assembly and dis-assembly of this modified type of valve is very simple, since it is only necessary to slip the upper arbor 25 from the lugs 20, whereupon the whole assembly may be removed and replaced.

The decided advantages of my novel valve are apparent from the above description and the cheapness of construction and adjustment may be readily seen.

It is to be understood that different forms of my preferred and modified form may be made without departing from the spirit of my invention.

Having thus described my invention, what I claim as new and desire to secure by Letters Patent, is:—

A valve structure including a plate or the like having a port therein, an elongated flexible valve having a hole in each end thereof and seated over said port, a rigid bridging member in normal operation slidably retaining the ends of said valve against said plate and having holes registering with the holes in the ends of said valve, said valve and said bridging member being bodily movable outwardly from said plate in response to excessive pressure at said port, means including pins secured to said plate and entering the holes in said valve and said bridging member for guiding the bodily outward movement of said valve and of said bridging member with respect to said plate, and means including a second bridging member fixed to said pins and spring means interposed between said second bridging member and said rigid bridging member for urging said rigid bridging member against said valve and plate.

ROLAND H. MONEY.